United States Patent
Biver et al.

(10) Patent No.: US 11,598,978 B2
(45) Date of Patent: Mar. 7, 2023

(54) OPTICAL LENS

(71) Applicant: Essilor International, Charenton-le-Pont (FR)

(72) Inventors: Claudine Biver, Charenton-le-Pont (FR); David Escaich, Charenton-le-Pont (FR); Mariska Barthelemy, Charenton-le-Pont (FR); Marie Engel, Paris (FR); Sira Uhalte Nogues, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 180 days.

(21) Appl. No.: 16/756,389

(22) PCT Filed: Oct. 18, 2018

(86) PCT No.: PCT/EP2018/078634
§ 371 (c)(1),
(2) Date: Apr. 15, 2020

(87) PCT Pub. No.: WO2019/077073
PCT Pub. Date: Apr. 25, 2019

(65) Prior Publication Data
US 2021/0191158 A1      Jun. 24, 2021

(30) Foreign Application Priority Data
Oct. 19, 2017 (EP) ..................... 17306422

(51) Int. Cl.
*G02C 7/10*         (2006.01)
*G02C 7/08*         (2006.01)
(52) U.S. Cl.
CPC ............. *G02C 7/102* (2013.01); *G02C 7/083* (2013.01); *G02C 2202/16* (2013.01); *G02C 2202/20* (2013.01)

(58) Field of Classification Search
CPC .... G02C 7/102; G02C 7/083; G02C 2202/16; G02C 2202/20; G02C 7/12; G02C 7/101
(Continued)

(56) References Cited

U.S. PATENT DOCUMENTS 3,195,145 A    7/1965    Tisher et al.
4,261,656 A    4/1981    Wu
(Continued)

FOREIGN PATENT DOCUMENTS

CN    201355406 Y    12/2009
CN    104321688 A    1/2015
(Continued)

OTHER PUBLICATIONS

International Search Report and Written Opinion dated Nov. 16, 2018 in PCT/EP2018/078634 filed on Oct. 18, 2018.
(Continued)

*Primary Examiner* — Tuyen Tra
(74) *Attorney, Agent, or Firm* — Oblon, McClelland, Maier & Neustadt, L.L.P.

(57) ABSTRACT

An optical lens intended to be placed before a wearer's eye and having a front surface and a rear surface, the rear surface being the surface intended to be the closest to the wearer's eye when the optical lens is placed before a wearer's eye, the optical lens having a mineral glass element on the front surface and further comprising an eye protector that is configured to prevent any piece of the mineral glass element from reaching the wearer's eye when the element is broken, said eye protector comprising a polymer wafer arranged on the rear surface.

20 Claims, 3 Drawing Sheets

(58) Field of Classification Search
USPC .................. 351/41, 159.01, 159.6, 159.61
See application file for complete search history.

(56) References Cited

U.S. PATENT DOCUMENTS

| | | | |
|---|---|---|---|
| 4,264,156 | A | 4/1981 | Spycher |
| 4,364,786 | A | 12/1982 | Smith, Jr. et al. |
| 4,679,918 | A | 7/1987 | Ace |
| 4,865,668 | A * | 9/1989 | Goepfert ............ B32B 17/10981 |
| | | | 156/107 |
| 4,921,341 | A | 5/1990 | Ace |
| 5,343,260 | A | 8/1994 | Henry et al. |
| 5,526,068 | A | 6/1996 | Markovitz |
| 2006/0006336 | A1 | 1/2006 | Cano et al. |
| 2008/0088044 | A1 | 4/2008 | Cano et al. |
| 2017/0102558 | A1 | 4/2017 | Saylor et al. |
| 2017/0139230 | A1 | 5/2017 | Ambler et al. |

FOREIGN PATENT DOCUMENTS

| | | |
|---|---|---|
| DE | 10 2016 105060 B3 | 7/2017 |
| EP | 0 116 924 A2 | 8/1984 |
| GB | 2 048 776 A | 12/1980 |
| JP | S59-164135 | 9/1984 |
| JP | H01-50013 A | 3/1989 |
| JP | H06-023766 | 2/1994 |
| JP | H06-027423 | 4/1994 |
| JP | H07159814 | 6/1995 |
| JP | H08190004 | 7/1996 |
| JP | S62-500616 | 8/1996 |
| JP | 2003149603 | 5/2003 |
| JP | 3198950 U | 7/2015 |

OTHER PUBLICATIONS

Combined Chinese Office Action and Search Report dated Nov. 17, 2020 in corresponding Chinese Patent Application No. 201880067721.0 (with English Translation), 17 pages.

Office Action dated Aug. 8, 2022 in Japanese Patent Application No. 2020-521894, with English translation, citing documents 15-23 therein.

Office Action dated Dec. 8, 2022 in European Patent Application No. 18789409.2.

* cited by examiner

OPTICAL LENS

FIELD OF THE INVENTION

The invention relates to an optical lens intended to be placed before a wearer's eye and having a front surface and a rear surface, the rear surface being the surface intended to be the closest to the wearer's eye when the optical lens is placed before a wearer's eye, and to an optical equipment comprising a pair of such optical lenses mounted in a spectacle frame.

BACKGROUND OF THE INVENTION

When manufacturing eyewear, the choice of material is important because it affects the weight and thickness of the lens and its resistance to shocks. There are two main types of materials used in optical lenses: organic materials, like polycarbonate, and mineral glass, like BK7.

Polycarbonate optical lenses have superior impact resistance. However, not all types of optical lenses may be made out of polycarbonate. For example, some lens manufacturing methods may require to reach such temperatures that polycarbonate or other organic materials would be altered. The lifetime of the optical lens could be lower. Therefore, mineral glass is sometimes the only available option.

However, in case of an accidental impact with sufficient force, mineral glass may shatter. As a consequence, pieces of mineral glass may break away and damage the eye of the wearer.

Therefore, there is a need for an optical lens comprising mineral glass which does not damage the wearer eyes by shattering in case of an accidental impact.

One object of the present invention is to provide such optical lens.

SUMMARY OF THE INVENTION

To this end, the invention proposes an optical lens intended to be placed before a wearer's eye and having a front surface and a rear surface, the rear surface being the surface intended to be the closest to the wearer's eye when the optical lens is placed before a wearer's eye, the optical lens having a mineral glass element on the front surface and further comprising an eye protector that is configured to prevent any piece of the mineral glass element from reaching the wearer's eye when the element is broken, said eye protector comprising a polymer wafer arranged on the rear surface.

Advantageously, the optical lens according to the invention is able to prevent pieces of glass from breaking away, thus protecting the eye of the wearer from being reached by the pieces of broken glass thanks to the polymer wafer.

According to further embodiments which can be considered alone or in combination:
- the polymer wafer is a plano wafer; and/or
- the polymer wafer has an average thickness greater than or equal to 10 µm, preferably greater than or equal to 50 µm, more preferably greater than or equal to 75 µm; even more preferably greater than or equal to 300 µm, and most preferably greater than or equal to 700 µm and/or
- the polymer wafer has an average thickness smaller than or equal to 2 mm, preferably smaller than or equal to 1.5 mm and more preferably smaller than or equal to 1 mm; and/or
- the polymer wafer has a front surface and a rear surface, the rear surface corresponding to the rear surface of the optical lens, and/or the front surface of the polymer wafer is glued to the mineral glass element; and/or
- the polymer wafer is made of a transparent material, for example transparent material adapted for ophthalmic lenses, such as thermoplastic or thermosetting material; and/or
- the polymer wafer has an anti-scratch function, an anti-static function, an anti-fouling function, and/or an anti-fog function; and/or
- the polymer wafer has a reflection function, for example antireflective properties; and/or
- the polymer wafer has a light absorption function, for example blue cut and/or UV protection, and/or the polymer wafer has a specific color; and/or
- the polymer wafer has a polarization function; and/or
- the polymer wafer has photochromic properties; and/or
- the polymer wafer extends over the edges of the optical lens so as to protect the edges of the optical lens; and/or
- the polymer wafer edges comprise a bevel adapted so as to allow mounting the optical lens in a spectacle frame; and/or
- the optical lens comprises a second polymer wafer arranged at least on the front surface of the optical lens; and/or
- the mineral glass element comprises at least an electro active element, such as electrochromic cells and/or liquid crystal cells and/or a wave guide and/or an holographic mirror; and/or
- the mineral glass element is configured so that it at least partially breaks when the drop ball test is applied to the lens; and/or
- the mineral glass element has a dioptric function, for example adapted to the prescription of a wearer.

The invention also relates to an optical equipment comprising a pair of optical lenses according to the invention mounted in a spectacle frame.

BRIEF DESCRIPTION OF THE DRAWINGS

Other characteristics and advantages of the invention will become more apparent from the claims and from the following description of some embodiments given by way of example without limitation with reference to the following drawings:

Figure 1:
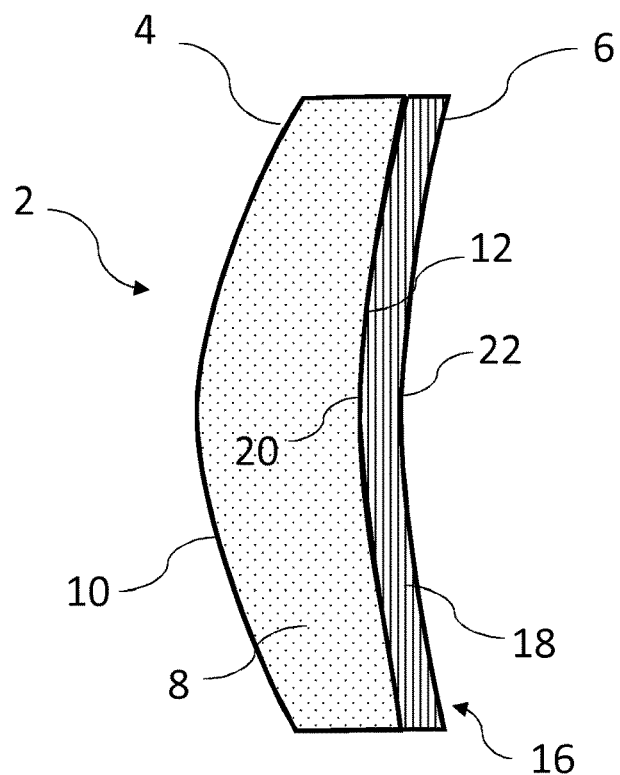
FIGS. 1 to 4 are cross-sectional views of optical lenses according to embodiments of the invention.

Elements in the figures are illustrated for simplicity and clarity and have not necessarily been drawn to scale. For example, the dimensions of some of the elements in the figures may be exaggerated relative to other elements to help improve the understanding of the embodiments of the present invention. Unless specified otherwise, each surface of an element which is represented on the figures as concave may also be convex and vice versa.

DETAILED DESCRIPTION OF PREFERRED EMBODIMENTS

The invention relates to an optical lens 2 intended to be placed before a wearer's eye and having a front surface 4 and a rear surface 6, the rear surface 6 being the surface intended to be the closest to the wearer's eye when the optical lens is placed before a wearer's eye.

In the framework of the invention, the term "optical lens" is to be understood to mean any type of known optical lens intended to be placed before a wearer's eye. An optical lens may refer to a non-corrective optical lens or to a corrective optical lens, also called ophthalmic lens, such as a progressive addition lens, or a unifocal lens, or a multifocal lens.

An ophthalmic lens has a dioptric function, which may be adapted to prescription data of the wearer.

The term "prescription" is to be understood to mean a set of optical characteristics of optical power, of astigmatism, of prismatic deviation, and, where relevant, of addition, determined by an ophthalmologist or optometrist in order to correct the vision defects of the wearer, for example by means of a lens positioned in front of his eye.

For example, the prescription for a progressive addition lens comprises values of optical power and of astigmatism at the distance-vision point and, where appropriate, an addition value. The prescription data may include data for emmetrope eyes.

As illustrated on FIGS. 1 to 4, the optical lens 2 comprises a mineral glass element 8 such as a silicate-based glass element, on the front surface 4. On the figures, the mineral glass element is represented as a dotted surface.

The mineral glass element 8 has a front surface 10 and a rear surface 12. The front surface 4 of the optical lens 2 comprises at least part of the front surface 10 of the mineral glass element 8.

The mineral glass element 8 may comprise a passive wave guide. Light that is coupled into the wave guide will propagate along the wave guide by total internal reflection. The wave guide comprises two opposite transparent walls with a gap either hollow or filled with a substrate. The length of the gap between the two opposite walls is determined so that light of a chosen wavelength may propagate through the wave guide by reflecting repeatedly on both opposite walls.

The mineral glass element 8 may comprise a passive holographic mirror. A holographic mirror is defined as being recorded using a holography process. The mirror is used to reflect a light beam generated from an image source, so as to cause the visualization of the image by the wearer. The holographic mirror is not used to reconstruct a recorded holographic image (as is the case in traditional hologram viewing). Due to the recording, the mirror is imparted an optical function, that is able, where applicable to modify the wave front of the light beam stemming from the image source, upon reflection onto said mirror. This allows to correct the virtual vision of the wearer, because the optical lens incorporating the holographic mirror can modify the light beam that generates the image in the eye of the wearer.

Figure 2:
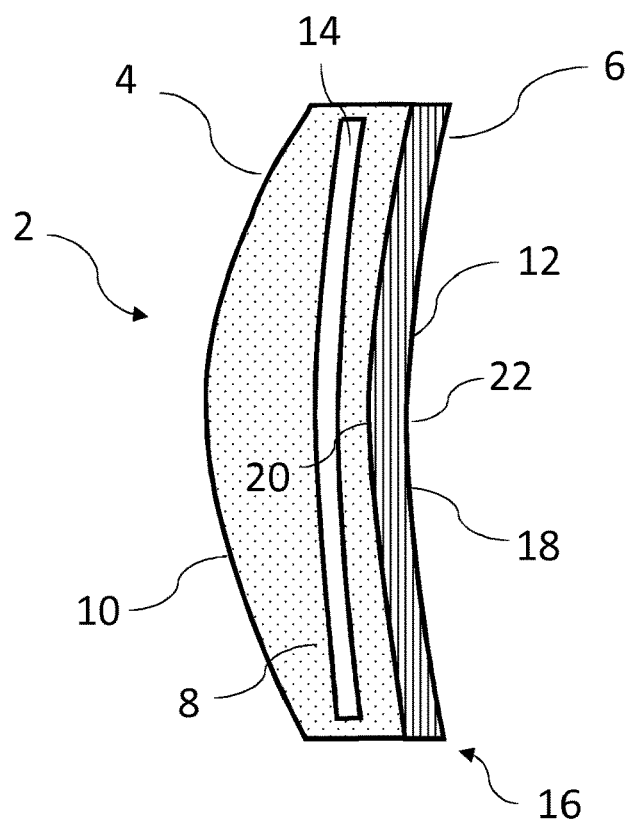

As illustrated on FIG. 2, the mineral glass element 8 may comprise one or more electro-active elements 14. An electro-active element 14 is an element having at least one alterable optical property with the application of electrical energy.

The electro active element 14 may be embedded inside the mineral glass element 8, or is formed from the mineral glass element 8. The electro active element 14 may be adapted to the edges of the mineral glass element 8, or to its front surface 10 or rear surface 12.

The electro-active element 14 may be an electrochromic cell between two transparent supports, for instance made of substrates. The electrochromic cell comprises at least one electrochromic dye compound having an oxidation potential and undergoing one optical property change upon application of an electrical field between transparent supports using at least two transparent electrodes. For example, a dye may be uncolored in an oxidation state and yellow, green, blue or violet in another oxidation state. The oxidation state of the dye may be controlled by applying an electric field, in other words a voltage, between the electrodes and to the electrochromic dye compound.

The electro-active element 14 may be a liquid crystal cell. The liquid crystal cell comprises at least one liquid crystalline substance between two transparent supports, for instance made of substrates. At least one of the transparent supports, for example both of the transparent supports, comprises at least one transparent electrode. The liquid crystal cell alters light based on the optical properties of the liquid crystalline substance in the presence or absence of an electric field, in other words a voltage, applied between the electrodes and to the liquid crystalline substance.

The electro-active element 14 may be an electro-active wave guide. The wave guide comprises two opposite transparent walls with a gap either hollow or filled with a substrate. The length of the gap between the two opposite walls is determined so that light of a chosen wavelength may propagate through the wave guide by reflecting repeatedly on both opposite walls. The electro-active wave guide may comprise one or more areas of tunable optical properties such as value of refractive index/indices, phase, reflectivity (value, angle, wavelengths or spectral curve), transmittance, etc. For example the walls may each comprise a transparent electrode, the gap is filled with a substrate and the active optical waveguide alters the propagation of light based on the refraction index of the substrate in the presence or absence of an electric field, in other words a voltage applied between the electrodes and to the substrate. The length of the gap may also be commanded.

The electro-active element 14 may be an electro-active holographic mirror. The holographic mirror may comprise one or more areas of tunable optical properties, such as value of refractive index/indices, phase, reflectivity (value, angle, wavelengths or spectral curve), transmittance, etc. The mineral glass element 8 may have a dioptric function which may be adapted to prescription data of the wearer.

As illustrated on FIGS. 1 to 4, the optical lens further comprises an eye protector 16 that is configured to prevent any piece of the mineral glass element 8 from reaching the wearer's eye when the mineral glass element 8 is broken. The eye protector 16 comprises a polymer wafer 18 arranged on the rear surface 6 of the optical lens 2. On the figures the polymer wafer 18 is represented as a vertical striped surface.

The polymer wafer 18 has a front surface 20 and a rear surface 22. The rear surface 6 of the optical lens 2 comprises at least part of the rear surface 22 of the polymer wafer.

The polymer wafer 18 prevents pieces of the mineral glass element 8 from being detached if the mineral glass element 8 breaks at least partially when the optical lens receives an impact.

An impact test may be performed. The impact test may be the so called "drop ball test". According to the drop ball test a ⅝-inch (1.5875 cm) steel ball weighing approximately 0.56 ounce (15.87573 g) is dropped from a height of 50 inches (127 cm) upon the convex upper surface of the lens. The ball shall strike within a ⅝-inch (1.5875 cm) diameter circle located at the geometric center of the lens.

The ball may be guided but not restricted in its fall by being dropped through a tube extending to within approximately 4 inches (10.16 cm) of the lens. To pass the drop ball test, the optical lens must not fracture.

An optical lens is considered fractured when it cracks through its entire thickness including a laminar layer if any and across a complete diameter into two or more separate pieces, or any lens material visible to the naked eye becomes detached from the surface of the lens which is intended to be facing the eye when the lens is positioned in front of the eye.

Advantageously, the optical lens 2 according to the invention passes the drop ball test even if the mineral glass element 8 is broken, thanks to the eye protector 16 comprising the polymer wafer 18.

According to embodiments of the invention, the polymer wafer 18 may have an average thickness greater than or equal to 10 µm, preferably greater than or equal to 50 µm, more preferably greater than or equal to 75 µm, even more preferably greater than or equal to 300 µm and most preferably greater than or equal to 700 µm, and smaller than or equal to 2 mm, preferably smaller than or equal to 1.5 mm and more preferably smaller than or equal to 1 mm. The inventors observed that a polycarbonate polymer wafer 18 of average thickness equal to or greater than 300 µm improves very well the impact resistance of the optical lens 2.

Furthermore, a polymer wafer 18 of average thickness, of about 800 µm further improves the optical performances of the optical lens 2. Indeed, when using a 300 µm wafer some optical distortion may appear due to wafer deformation during manufacture, particularly during the coating process.

In preferred embodiments, the rear surface 22 of the polymer wafer 18 corresponds to the rear surface 6 of the optical lens.

The front surface 20 of the polymer wafer 18 may be glued to the mineral glass element 8, for example glued to a rear surface 12 of the mineral glass element 8. For example, glue may be spread on the rear surface 12 of the mineral glass element 8, and then the polymer wafer 18 may be dropped on the spread glue. In order to avoid deformation of the polymer wafer 18 caused by the weight of the mineral glass element 8, the polymer wafer 18 may be put on the mineral glass element 18 during the gluing process.

The polymer wafer 18 may be glued to the mineral glass element 8 by means of a liquid adhesive or a pressure sensitive adhesive (PSA). The glue composition may be chosen based on the material of the polymer wafer 18 to be bonded with the mineral glass element. In the case of a wafer obtained from a film, a PSA is preferably used.

Gluing may be carried out on the whole surface of the polymer wafer 18 or only on a periphery of the polymer wafer 18. In this second case, spacers may be introduced into the liquid glue to ensure a uniform thickness of glue over the entire periphery of the polymer wafer 18.

A surface treatment of plasma or corona treatment type may be applied to the mineral glass element 8. Advantageously, spreading of the adhesive on the mineral glass element 8 and on the polymer wafer 18 is ensured as well as the adhesion between the mineral glass element 8 and the polymer wafer 18.

An adhesion primer may be used during the gluing process so as to facilitate adhesion.

The polymer wafer 18 may be trimmed or cut before being glued to the mineral glass element 8. If the polymer wafer 18 is obtained from a film, the cutting of the polymer wafer 18 may be performed using a laser. Gluing is particularly advantageous because the polymer wafer 18 and the mineral glass element 8 remain integral for a very long time and because contrary to other fixation means, glue is transparent, therefore does not limit the field of view of the wearer. Preferably, the glue may take the shape of a layer having uniform thickness over the front surface 20 of the polymer wafer 18.

Alternatively, the polymer wafer 18 may be bound to the mineral glass element 8 in any another manner known from the skilled person.

The polymer wafer 18 comprises at least a base wafer. The polymer wafer may also comprise one or more functional layers supported by the base wafer.

The base wafer can be obtained by casting or by injection, or by surfacing, starting with a thicker blank. The base wafer can also be obtained from a film. This film can itself be obtained by various techniques, for example by extrusion, then mono or biaxial stretching. This film is then thermoformed in order to give the wafer the radius of curvature adapted to the radius of curvature of the mineral glass on which the wafer is bonded.

The base wafer can also be obtained by deposition of a layer by conventional deposition techniques known to those skilled in the art, such as by dip coating, spin coating, spray coating, inkjet coating, etc. followed if necessary by a drying and/or a polymerization step under UV or visible irradiation or by heat treatment.

Finally, the base wafer can be realized directly on the mineral glass by additive manufacturing techniques.

The polymer wafer 18 may be laminated on the mineral glass element 8. The lamination method may include a lamination step during which a specific retention system of the mineral glass element 8 is used, the retention system being configured to avoid damaging the periphery of the mineral glass element 8 during the lamination step.

By way of non-limiting indication, the material of the base wafer may be chosen from materials for optics and in particular for ophthalmic optics. The material may be chosen from thermoplastic or thermosetting materials such as, for example, polycarbonates; polyamides; polyimides; polysulfones; copolymers of polyethylene terephthalate and polycarbonate; polyolefins, in particular polynorbornenes; polymers and copolymers of diethylene glycol bis (allyl carbonate); (meth) acrylic polymers and copolymers, in particular polymers and (meth) acrylic copolymers derived from bisphenol-A; thio (meth) acrylic polymers and copolymers; urethane and thiourethane polymers and copolymers; epoxy polymers and copolymers; episulfide polymers and copolymers, cellulose polymers and copolymers, in particular cellulose triacetates, vinyl polymers and copolymers, in particular polyvinyl chlorides, urethane polymers and copolymers, in particular thermoplastic polyurethanes, and siloxane polymers and copolymers.

According to an embodiment, if the base wafer is obtained from a film, the materials of this film may be chosen by way of non-limiting indication from polyethylene terephthalate, polyethylene naphtalate, polycarbonate, polyethersulfone, polyarylate, polyvinylalcohol, polycyclic olefine, polyamide, polyurethane or polyimide. The film may also be a structure comprising multiple superimposed layers, or a multilayered film, or a composite film. The film may comprise one or more functional treatments such as an anti-scratch coating, an antireflective coating, an anti-fouling coating, a UV or blue cut coating. The film may be a multilayered antifragmentation film. The film may comprise microstructures on its surface such as structured anti-reflections, Fresnel lenses, microlenses, metasurfaces, or holographic mirrors, such as embossed holograms.

The polymer wafer 18 may be a plano, also called non corrective, wafer. Alternatively, the polymer wafer 18 may have specific optical properties, which may include a dioptric function, which may include sphere power, cylinder power, cylinder axis, addition, bifocal or trifocal or progressive surfaces and/or prism.

The optical properties of the polymer wafer 18 may include a reflection function, for example antireflective properties. Advantageously, a polymer wafer 18 with antireflective properties reflects a low fraction of light, therefore a large fraction of light is instead transmitted through the polymer wafer 18 and through the optical lens 2. The reflection function may be different for the front surface 20 and the rear surface 22 of the polymer wafer 18. It is preferable, especially if the optical lens 2 is intended to be mounted on solar eyewear, that the front surface 20 of the polymer wafer 18 has a high reflectance in order to reduce the fraction of light transmitted through the optical lens 2 towards the eye of the wearer. It is also preferable that the rear surface 22 of the polymer wafer 18 has a low reflectance in order to avoid reflecting environmental light towards the eye of the wearer.

The optical properties of the polymer wafer 18 may include a light absorption function, for example blue cut and/or UV protection. Blue light is known to induce glare and eyestrain. The light absorption function may absorb a large fraction of blue and UV light in order to protect the eye of the wearer.

The optical properties of the polymer wafer 18 may include a specific color. The polymer wafer 18 may be colored. The color may be chosen based on wearer preference.

The optical properties of the polymer wafer 18 may include a polarization function. The polymer wafer 18 may transmit only light having a specific direction of polarization.

The optical properties of the polymer wafer 18 may include photochromic properties. The polymer wafer 18 may darken on exposure to specific types of light of sufficient intensity, such as blue or UV light.

The polymer wafer 18 may have other properties, which may include an anti-scratch function, an anti-static function, an anti-fouling function, an anti-fog function and/or an optical lens edges protection function. The optical lens edges protection function may include a protection of the optical lens 2 against shocks, impacts or abrasions. The optical lens edges protection function may include sealing the edge of the optical lens 2 with respect to the external environment, such as moisture, solvents, oxygen, and the like. Such protection is useful in particular in embodiments where the electro active element 14 extends to the edge of the optical lens 2.

Figure 3:
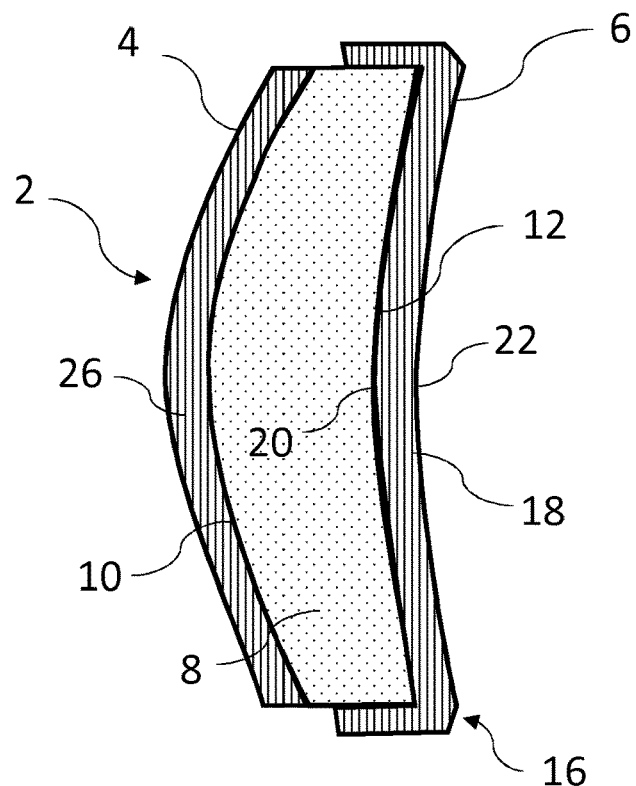

As illustrated on FIG. 3, the polymer wafer 18 may extend over the edges of the optical lens 2 so as to protect the edges of the optical lens 2. In particular, the polymer wafer 18 may extend over the edges of the mineral glass element 8, forming a compressible buffer region between the mineral glass element 8 and a spectacle frame element of a spectacle frame. A specific intermediate seal may be inserted between the edges of the optical lens 2 and the part of the polymer wafer 18 extending over said edges.

The abovementioned optical properties or other properties of the polymer wafer 18 may be properties of the base wafer, or properties of a functional layer if any, or properties of a combination of the base wafer with a functional layer.

Figure 4:
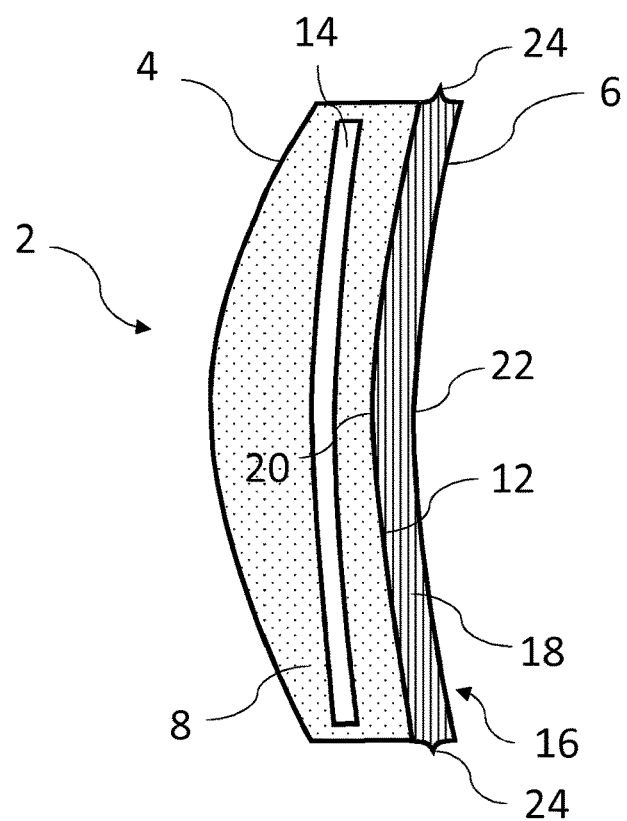

The polymer wafer edges may comprise a bevel 24, as illustrated on FIG. 4, adapted so as to allow mounting the optical lens in a spectacle frame. The bevel may comprise an outward bump and/or an inward cavity.

In an embodiment the optical lens 2 may comprise a second polymer wafer 26 arranged at least on the front surface of the optical lens 2. The second polymer wafer 26 may have any of the features described for the polymer wafer 18 arranged at least on the rear surface 12. The second polymer wafer 26 may have different functional layers from the polymer wafer 18 arranged at least on the rear surface 12.

The refractive indices of the materials which constitute the mineral glass element 8, glue, polymer wafer 18 and second polymer wafer 26 should preferably be as close as possible to each other in order to avoid reflective light losses at the interfaces. Alternatively, if the materials have very different refractive indices, the geometry of the interfaces must be determined precisely. In particular, it is necessary to control the width of the mineral glass element 8, glue, polymer wafer 18 and second polymer wafer 26 in order to avoid creating non-compensated diopters. Moreover, it is important to avoid surface irregularities which may generate optical deformations difficult to compensate.

Figure 5:
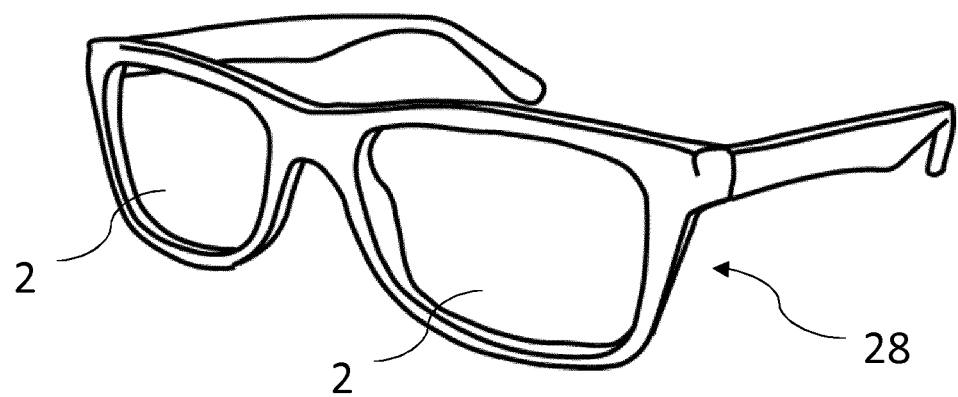
FIG. 5 illustrates an optical equipment according to an embodiment of the invention.

The invention also relates to an optical equipment 28, as illustrated on FIG. 5, comprising a pair of optical lenses 2 according to the invention mounted in a spectacle frame.

The invention has been described above with the aid of embodiments without limitation of the general inventive concept.

Many further modifications and variations will suggest themselves to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. An optical lens intended to be placed before a wearer's eye, the optical lens comprising:
    a front surface;
    a rear surface, the rear surface being a surface intended to be closest to the wearer's eye when the optical lens is placed before a wearer's eye;
    a mineral glass element on the front surface; and
    an eye protector that is configured to prevent any piece of the mineral glass element from reaching the wearer's eye when the element is broken, said eye protector comprising a polymer wafer arranged at least on the rear surface, wherein
    the mineral glass element comprises at least an electro active element.

2. The optical lens according to claim 1, wherein the polymer wafer is a plano wafer.

3. The optical lens according to claim 1, wherein the polymer wafer has an average thickness greater than or equal to 10 µm and smaller than or equal to 2 mm.

4. The optical lens according to claim 1, wherein the polymer wafer has a front surface and a rear surface, the rear surface corresponding to the rear surface of the optical lens and the front surface being glued to the mineral glass element.

5. The optical lens according to claim 1, wherein the polymer wafer is made of a transparent material.

6. The optical lens according to claim 5, wherein the transparent material is a transparent material adapted for ophthalmic lenses.

7. The optical lens according to claim 6, wherein the transparent material adapted for ophthalmic lenses comprises a thermoplastic or thermosetting material.

8. The optical lens according to claim 1, wherein the polymer wafer has a reflection function and/or a light absorption function and/or the polymer wafer has a specific color.

9. The optical lens according to claim 8, wherein the reflection function is antireflective properties.

10. The optical lens according to claim 9, wherein the light absorption function is blue cut and/or UV protection.

11. The optical lens according to claim 1, further comprising a second polymer wafer arranged at least on the front surface of the optical lens.

12. The optical lens according to claim 1, wherein the polymer wafer has a polarization function.

13. The optical lens according to claim 1, wherein the polymer wafer has photochromic properties.

14. The optical lens according to claim 1, wherein the polymer wafer extends over edges of the optical lens so as to protect the edges of the optical lens.

15. The optical lens according to claim 1, wherein edges of the polymer wafer comprise a bevel adapted so as to allow mounting the optical lens in a spectacle frame.

16. The optical lens according to claim 1, wherein the mineral glass element is configured so that it at least partially breaks when a drop ball test is applied to the optical lens.

17. The optical lens according to claim 1, wherein the mineral glass element has a dioptric function.

18. The optical lens according to claim 17, wherein the dioptric function is adapted to a prescription of a wearer.

19. An optical equipment comprising a pair of optical lenses according to claim 1 mounted in a spectacle frame.

20. The optical lens according to claim 1, wherein the electro active element is electrochromic cells and/or liquid crystal cells and/or a wave guide and/or a holographic mirror.

* * * * *